(12) United States Patent
Byon et al.

(10) Patent No.: US 10,848,652 B2
(45) Date of Patent: Nov. 24, 2020

(54) CAMERA MODULE INCLUDING PLURAL DRIVING UNITS HAVING DIFFERENT MAGNETIC FIELD DIRECTIONS

(71) Applicant: Samsung Electronics Co., Ltd., Gyeonggi-do (KR)

(72) Inventors: Kwang Seok Byon, Gyeonggi-do (KR); Young Jae Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 16/137,877

(22) Filed: Sep. 21, 2018

(65) Prior Publication Data

US 2019/0098182 A1 Mar. 28, 2019

(30) Foreign Application Priority Data

Sep. 25, 2017 (KR) .................. 10-2017-0123439

(51) Int. Cl.
| | |
|---|---|
| *H04N 5/232* | (2006.01) |
| *H04N 5/225* | (2006.01) |
| *G02B 13/00* | (2006.01) |
| *G03B 13/36* | (2006.01) |
| *G02B 7/10* | (2006.01) |

(Continued)

(52) U.S. Cl.
CPC ........... *H04N 5/2252* (2013.01); *G02B 7/102* (2013.01); *G02B 13/001* (2013.01); *G02B 13/009* (2013.01); *G02B 13/0065* (2013.01); *G02B 27/646* (2013.01); *G03B 13/36* (2013.01); *H04N 5/2253* (2013.01); *H04N 5/2254* (2013.01); *H04N 5/2257* (2013.01); *H04N 5/23248* (2013.01); *H04N 1/00* (2013.01); *H04N 2101/00* (2013.01)

(58) Field of Classification Search
CPC .. H04N 5/2252; H04N 5/2253; H04N 5/2257; H04N 5/23248; H04N 5/2254; H04N 1/00; G02B 13/009; G02B 7/102; G02B 13/0065; G02B 27/646; G02B 13/001; G03B 13/36; G03B 2205/0069; G03B 3/10; G03B 5/00
USPC ....... 359/684, 686, 687, 676, 689, 690, 698, 359/755
See application file for complete search history.

(56) References Cited

U.S. PATENT DOCUMENTS

| | | |
|---|---|---|
| 8,913,139 B2 | 12/2014 | Park et al. |
| 9,225,886 B2 | 12/2015 | Yeo |

(Continued)

OTHER PUBLICATIONS

International Search Report dated Jan. 14, 2019.
European Search Report dated Jul. 31, 2020.

*Primary Examiner* — Hung H Lam
(74) *Attorney, Agent, or Firm* — Cha & Reiter, LLC.

(57) ABSTRACT

A camera module is disclosed herein, including a housing, a lens unit arranged in the housing and including at least one lens, a first driving unit arranged adjacent to a first surface inside the housing and configured to move the at least one lens in a direction along an optical axis, and a second driving unit arranged adjacent to the first surface inside the housing to move the lens unit in a direction perpendicular to the optical axis, where the first driving unit forms a first magnetic field oriented in a first direction, and wherein the second driving unit forms a second magnetic field oriented in a second direction intersecting the first direction at a pre specified angle.

19 Claims, 9 Drawing Sheets

(51) Int. Cl.
*G02B 27/64* (2006.01)
*H04N 101/00* (2006.01)
*H04N 1/00* (2006.01)

(56) References Cited

U.S. PATENT DOCUMENTS

| | | |
|---|---|---|
| 9,407,799 B2 | 8/2016 | Kasamatsu |
| 9,467,603 B2 | 10/2016 | Kasamatsu |
| 9,618,768 B2 | 4/2017 | Yeo |
| 9,766,476 B2 | 9/2017 | Yeo |
| 2007/0242938 A1* | 10/2007 | Uno .................. G02B 27/646 396/55 |
| 2009/0034950 A1* | 2/2009 | Takagi ................ G03B 17/00 396/55 |
| 2014/0078328 A1 | 3/2014 | Park et al. |
| 2014/0355120 A1 | 12/2014 | Yeo |
| 2015/0015729 A1 | 1/2015 | Kasamatsu |
| 2015/0110482 A1* | 4/2015 | Suzuka ............... G02B 27/646 396/55 |
| 2015/0207968 A1* | 7/2015 | Yeo ....................... G03B 5/00 348/374 |
| 2015/0229842 A1 | 8/2015 | Kasamatsu |
| 2016/0018720 A1 | 1/2016 | Bachar et al. |
| 2016/0085087 A1 | 3/2016 | Yeo |
| 2016/0109720 A1 | 4/2016 | Hu et al. |
| 2016/0154249 A1 | 6/2016 | Yeo |
| 2017/0031131 A1 | 2/2017 | Chan et al. |
| 2017/0168314 A1 | 6/2017 | Chan et al. |
| 2017/0168315 A1 | 6/2017 | Yeo |
| 2017/0343832 A1 | 11/2017 | Yeo |
| 2019/0041662 A1 | 2/2019 | Chan et al. |

* cited by examiner

CAMERA MODULE INCLUDING PLURAL DRIVING UNITS HAVING DIFFERENT MAGNETIC FIELD DIRECTIONS

CROSS-REFERENCE TO RELATED APPLICATION(S)

This application is based on and claims priority under 35 U.S.C. § 119 to Korean Patent Application No. 10-2017-0123439, filed on Sep. 25, 2017, in the Korean Intellectual Property Office, the disclosure of which is incorporated by reference herein its entirety.

TECHNICAL FIELD

The present disclosure relates to a camera module including a plurality of driving units.

BACKGROUND

As information technology (IT) has developed, various types of electronic devices such as a smart phone, a tablet personal computer (PC), and the like a widely used.

A modern electronic device may include a camera module. The camera module may be miniaturized for inclusion in the electronic device and may implement various functions. For example, the camera module may include a zoom function for capturing a subject at various magnifications. As another example, the camera module may further include an auto focus (AF) function.

In order for the camera module to support a variety of functions, a plurality of driving units capable of changing the positions of a plurality of lenses included in the camera module are utilized. As the driving unit, a voice coil motor (VCM) is often used, which operates by way of a magnetic field generated by a current flowing through a coil.

The above information is presented as background information only to assist with an understanding of the present disclosure. No determination has been made, and no assertion is made, as to whether any of the above might be applicable as prior art with regard to the present disclosure.

SUMMARY

When the camera module includes a plurality of driving units, two or more driving units may be arranged adjacent to each other on one surface of the camera module. In addition, since the camera module included in the electronic device has gradually increased in miniaturization, the interval between two or more driving units arranged on the one surface may be more narrowed.

When the interval between the driving units is narrowed, each driving unit may be influenced by the magnetic fields formed in adjacent driving units. As a result, the accuracy of position movement of the lens by the driving unit may be reduced, and the camera module may not perform its diverse functions normally.

In addition, using a shielding member to prevent the influence of the magnetic field generated by an adjacent driving unit enlarges the size of a camera module. Accordingly, the inclusion of a shield is not suitable when the goal is for the electronic device to be increasingly miniaturized.

Aspects of the present disclosure are to address at least the above-mentioned problems and/or disadvantages and to provide at least the advantages described below. Accordingly, an aspect of the present disclosure is to provide a camera module that can solve the above-mentioned problems.

In accordance with an aspect of the present disclosure, a camera module includes a housing, a lens unit arranged in the housing and including at least one lens, a first driving unit arranged adjacent to a first surface inside the housing, and configured to move the at least one lens in a direction of an optical axis, and a second driving unit arranged adjacent to the first surface inside the housing to move the lens unit in a direction perpendicular to the optical axis, where the first driving unit forms a first magnetic field oriented in a first direction, and wherein the second driving unit forms a second magnetic field oriented in a second direction intersecting the first direction at a specified angle.

In accordance with another aspect of the present disclosure, a camera module includes a housing, a lens unit disposed within the housing and including first and second lenses movable along a specified path, a first driving unit including a first coil arranged on a part of one surface of the housing, the first coil formed in a shape to output, in a first orientation, a first magnetic field for moving the first lens along the specified path, and a second driving unit including a second coil arranged on another part of the one surface, the second coil formed in a shape to output, in a second orientation perpendicular to the first orientation, a second magnetic field for moving the second lens along the specified path.

According to the embodiments of the present disclosure, the positional movement of the lens included in the camera module can be stably performed. Thus, the camera module may stably perform the zoom function, the auto-focus or "AF" function, and the optical image stabilizer "OIS" function. In addition, according to the embodiments of the present disclosure, the size of the camera module may be miniaturized and the electronic device including the camera module may efficiently utilize the limited mounting area. In addition, various effects that are directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, similar components may be assigned with similar reference numerals.

DETAILED DESCRIPTION

Figure 1:
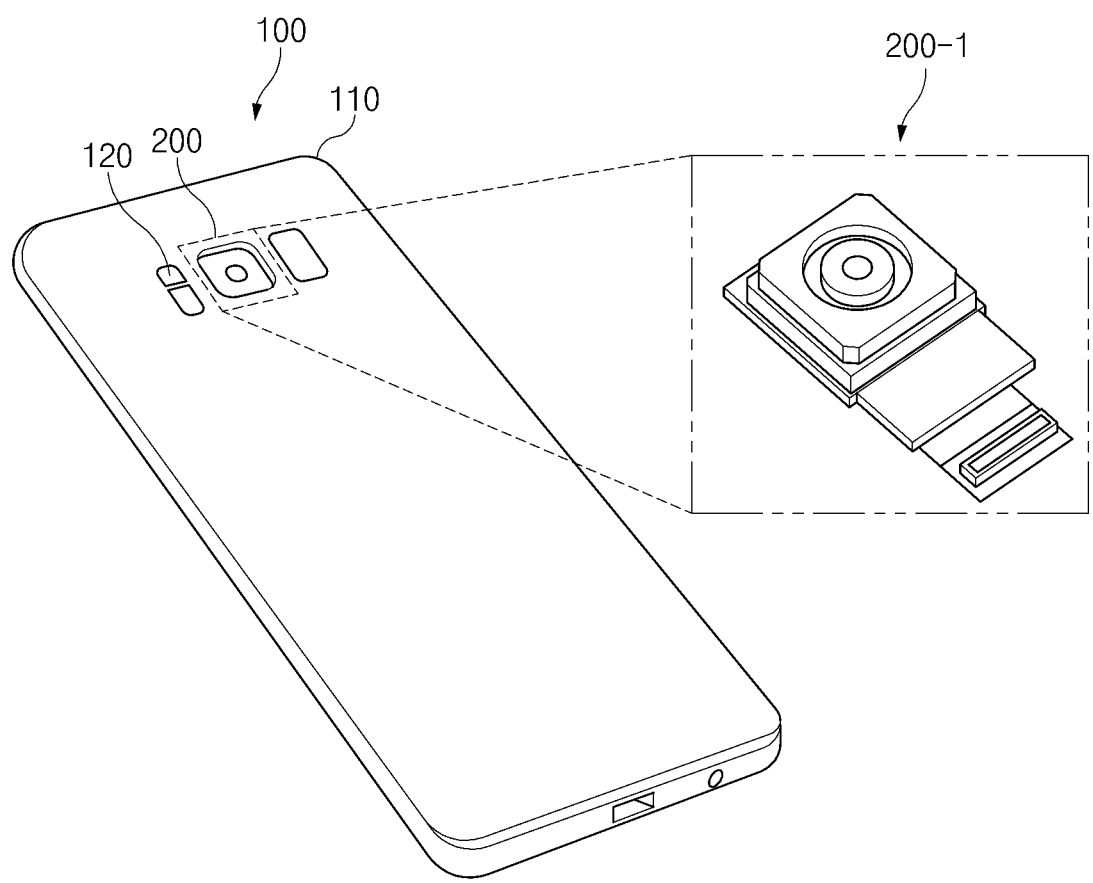
FIG. 1 is a view illustrating a camera module and an electronic device including the camera module according to an embodiment.

FIG. 1 is a view illustrating a camera module and an electronic device including the camera module according to an embodiment.

Referring to FIG. 1, a rear cover 110, a flash 120, and/or a camera module 200 may be arranged on a rear surface of an electronic device 100. According to various embodiments, a part of the above-described configuration may be omitted or a component that is not shown in FIG. 1 may be added. For example, a fingerprint sensor may be arranged on the rear surface of the electronic device. As another example, a camera separated from the camera module 200 may be additionally arranged on the rear surface of the electronic device.

The rear cover 110 may be coupled to the rear surface of the electronic device 100. The rear cover 110 may be formed of tempered glass, a plastic injection molding material, metal, or the like. According to an embodiment, the rear cover 110 may include at least one opening through which the fingerprint sensor, the flash 120, and/or the camera module 200 may be exposed.

The flash 120 may assist the photographing of the camera module 200 by emitting light. According to an embodiment, the flash 120 may emit automatically or by user manipulation when the illuminance outside the electronic device 100 is below a specified reference. According to various embodiments, the flash 120 may be a part of the camera module 200.

The camera module 200 may be an optical device capable of photographing an image or moving image of a subject. According to an embodiment, a part of the camera module 200 may be exposed to an outside through the at least one opening included in the rear cover 110. When the camera module 200 included in the electronic device 100 is disassembled and enlarged, the camera module 200 may be the same as or similar to a camera module 200-1.

According to an embodiment, the camera module 200 may be arranged on a front surface of the electronic device 100. According to an embodiment, a separated camera module may be additionally arranged on a rear surface of the electronic device 100. In this case, the electronic device 100 may photograph different portions and combine the photographed images into one image.

According to various embodiments, the camera module 200 may include various functions. For example, the camera module 200 may include an auto focus (AF) function. The auto focus function may mean a function of automatically focusing on a subject by adjusting a position of at least one lens of the camera module 200. As another example, the camera module 200 may include an optical image stabilization (OIS) function. The OIS function may mean a function of correcting the movement of an image due to an operation of a user. As still another example, the camera module 200 may include a zoom in or out function. The camera module 200 may adjust the size of an image by adjusting the position of at least one lens.

Hereinafter, in the present disclosure, the camera module 200 that may be included in the electronic device 100 will be described.

Figure 2A:
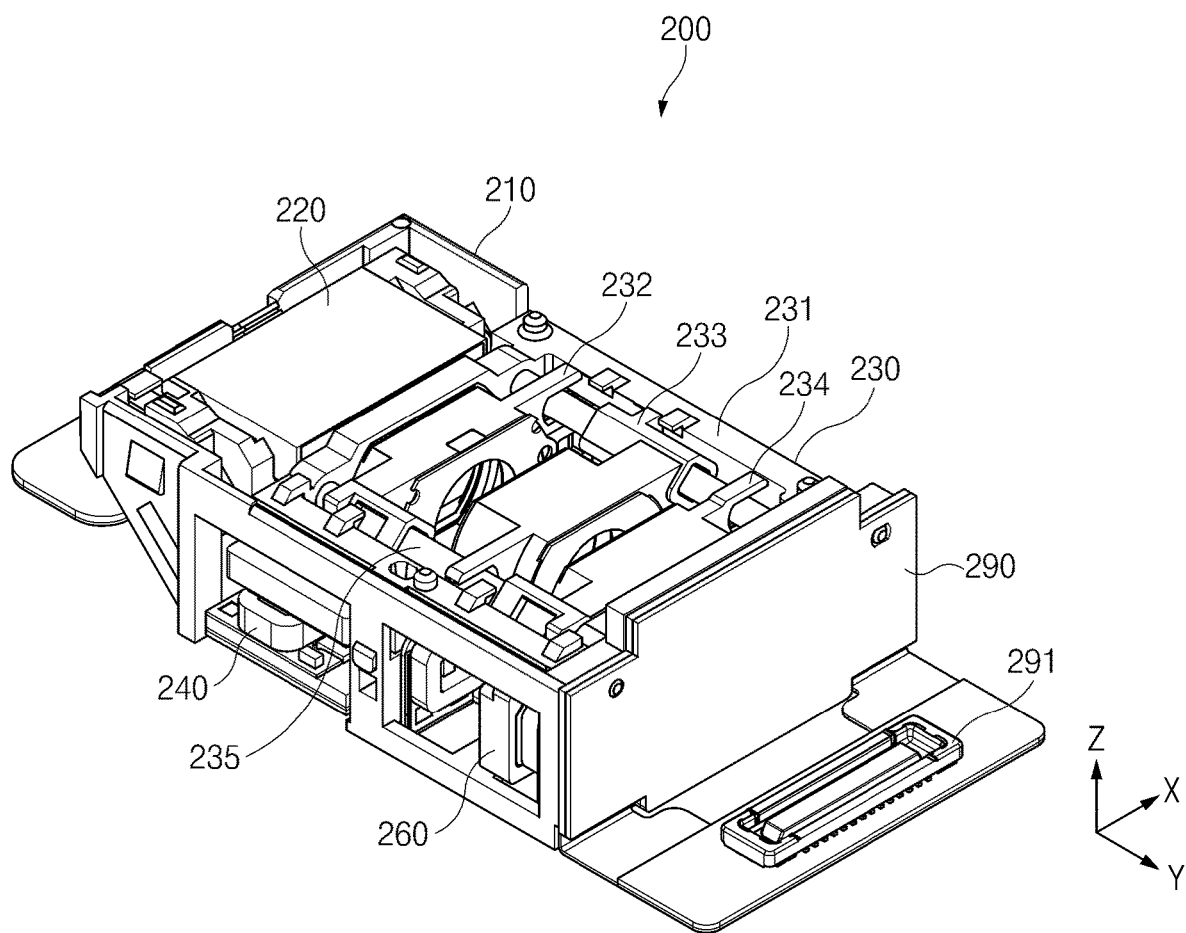
FIG. 2A is a perspective view of a camera module according to an embodiment when viewed in one direction.

FIG. 2A is a perspective view of a camera module according to an embodiment when viewed in one direction.

Figure 2B:
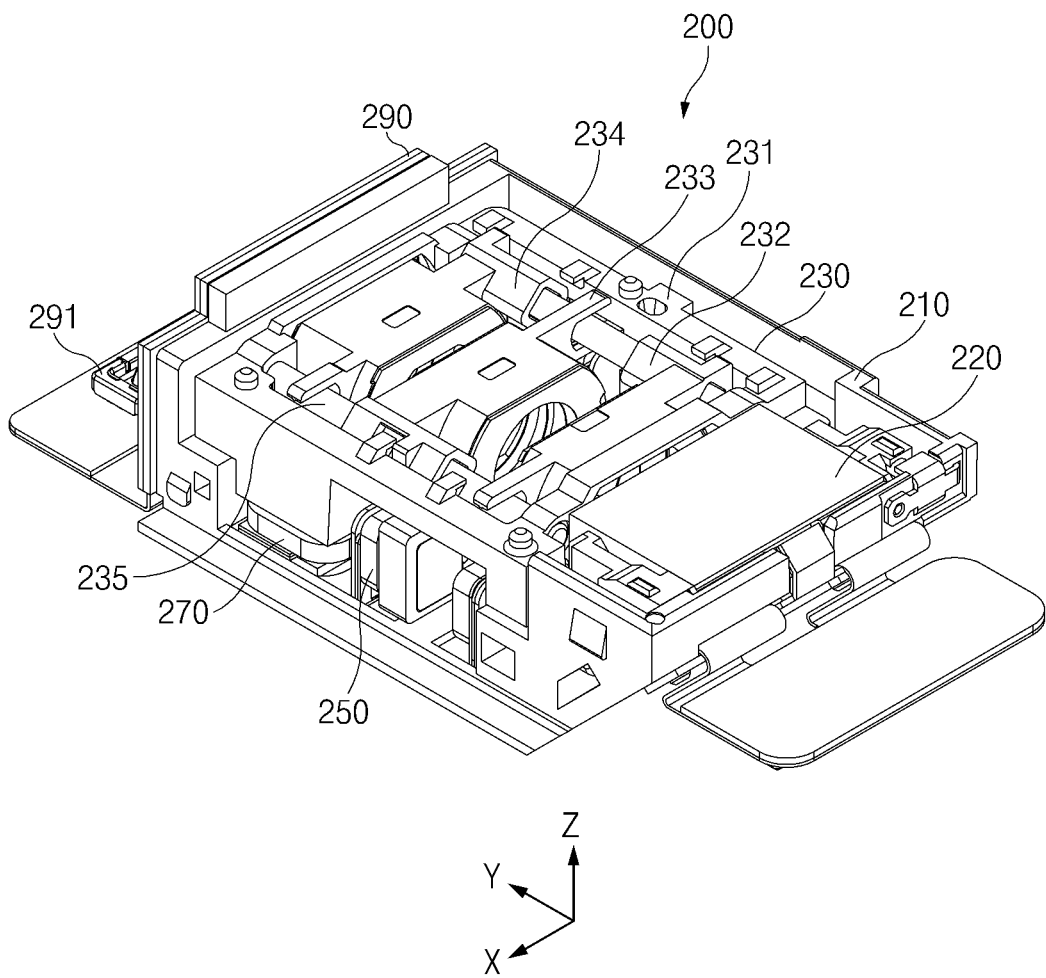
FIG. 2B is a perspective view of a camera module according to an embodiment when viewed in another direction.

FIG. 2B is a perspective view of a camera module according to an embodiment when viewed in another direction.

Figure 2C:
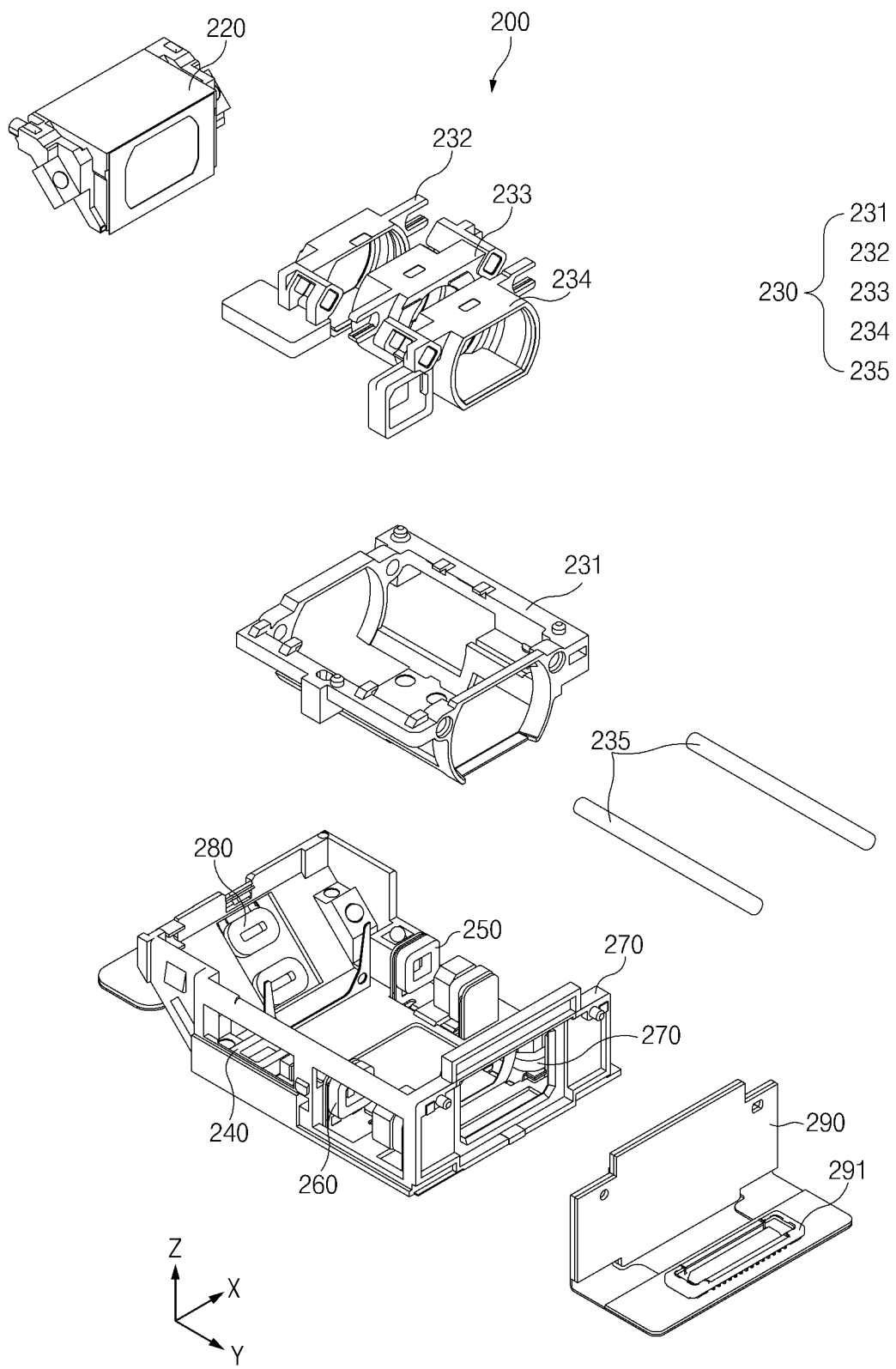
FIG. 2C is an exploded perspective view of a camera module according to an embodiment.

FIG. 2C is an exploded perspective view of a camera module according to an embodiment.

Referring to FIGS. 2A to 2C, the camera module 200 may include a housing 210, a reflection member 220, a lens unit 230, first to fifth driving units 240, 250, 260, 270 and 280, an image sensor 290, and a connector 291. According to various embodiments, some of the components described above may be omitted from the camera module 200 or the camera module 200 may further include additional components. For example, the third and/or fourth driving units 260 and/or 270 of the camera module 200 may be omitted depending on the number of lenses included in the lens unit 230. In yet another example, the camera module 200 may further include a cover that at least partially surrounds or encloses the housing 210.

The housing 210 may enclose the components of the camera module 200 and protect the components from external shocks and impact. According to an embodiment, the housing 210 may be formed of tempered glass, a plastic injection material, and/or a non-magnetic member.

According to various embodiments, the housing 210 may include a plurality of surfaces. For example, the housing 210 may be formed as a hexahedron. As another example, the housing 210 may be a hexahedron, in which at least a portion of one or more of its surfaces is inclined as shown in FIG. 2.

According to an embodiment, an opening may be formed on one side of the housing 210. The camera module 200 may receive light reflected off or generated by an external subject through the opening. According to an embodiment, the connector 291 may be attached to one side of the housing 210. The camera module 200 may be electrically connected to a processor of the electronic device 100 through the connector 291.

The reflection member 220 may reflect or refract the light received from the external subject in a direction (Y axis) of the lens unit 230. In the present disclosure, the direction of light passing through the reflection member 220 and directed to the lens unit 230 may be referred to as an "optical axis direction."

According to an embodiment, the reflection member 220 may be rotated in the Y-Z plane about the X-axis direction by at least one driving unit 280. When the reflection member 220 rotates in the Y-Z plane about the X-axis direction, the direction of the light passing through the reflection member 220 may be changed according to the rotated angle. In an embodiment, the camera module 200 may correct the image by rotating the reflection member 220 in a direction opposite to the hand tremble of the user with respect to the Z-axis direction.

The lens unit 230 may be arranged in the housing 210 and may include a lens holder 231, first to third lenses 232 to 234, and a shaft 235. According to various embodiments, one or more of the components described above may be omitted from the lens unit 230 or the lens unit 230 may include further, additional components. For example, at least one of the first to third lens 232 to 234 may be omitted.

According to an embodiment, the lens holder 231 may contain at least one lens 232 to 234 included in the lens unit 230. According to an embodiment, the lens holder 231 may be coupled with the at least one lens 232 to 234 through the shaft 235.

In an embodiment, the lens holder 231 may be moved in the X-axis direction by at least one driving unit 270. The X-axis direction may be understood as a direction perpendicular to the optical axis direction. In this case, the at least one lens 232 to 234 contained in the lens holder 231 may be moved in a same direction together with the lens holder 231. In an embodiment, the camera module 200 may correct the image by moving the lens holder 231 in the direction or manner opposing hand trembling of the user, with respect to the X-axis direction.

According to an embodiment, the first to third lenses 232 to 234 may adjust a path of the light introduced in the optical axis direction, such that the light converges to one focal point or diverges from one focal point. The camera module 200 may change the size or focus of an image by adjusting the intervals between the first to third lenses 232 to 234.

According to an embodiment, each of the first to third lenses 232 to 234 may be implemented by one group of lenses in which a plurality of single lenses are combined with each other. For example, the first lens 232 may include one group of lenses in which three single lenses are combined with each other. In the present disclosure, the first lens 232 may be referred to as a first group of lenses, the second lens 233 may be referred to as a second group of lenses, and the third lens 234 may be referred to as a third group of lenses.

According to an embodiment, the first to third lenses 232 to 234 may be moved along a specified path by the first to third driving units 240, 250 and 260 which are coupled to the first to third lenses 232 to 234, respectively. In an embodiment, the specified path may be the Y-axis direction. The Y-axis direction may be understood as a direction parallel to the optical axis direction. According to an embodiment, the specified path may be specified by the shaft 235. Each lens may be coupled with the shaft 235 and may be moved in a front or rear direction along the shaft 235. The front direction may be understood as a direction in which each lens is close to the reflection member 220, and the rear direction may be understood as a direction in which each lens is away from the reflection member 220.

According to an embodiment, the first lens 232 may be a lens for performing the auto focus function. The camera module 200 may measure the distance to a subject by using infrared rays and may adjust the position of the first lens 232 based on the measured distance. For example, when the position of the first lens 232 is positioned relatively behind to be focused on the subject, the camera module 200 may move the first lens 232 forward by using the first driving unit 240.

According to an embodiment, the second and third lenses 233 and 234 may be lenses for performing a zoom-in or zoom-out function. According to an embodiment, the camera module 200 may have a preset discrete magnification option. For example, a magnification option such as a magnification power of 2 times, a magnification power of 3 times, a magnification power of 5 times, or the like may be preset in the camera module 200. In an embodiment, the magnification may be determined according to relative positions of the second and third lenses 233 and 234. For example, when the distance between the second and third lenses 233 and 234 is increased, the overall magnification may be increased.

According to an embodiment, the second and third lenses 233 and 234 may be temporarily fixed at two specified positions, respectively. For example, the second lens 233 may be temporarily fixed at a first position which is the foremost position of the specified path and a second position which is the rearmost position of the specified path. As another example, the third lens 234 may be temporarily fixed at a third position which is the foremost position of the specified path and a fourth position which is the rearmost position of the specified path. In an embodiment, since the magnification of the camera module 200 is determined by the relative positions of the second and third lenses 233 and 234, the camera module 200 may have a total of four magnification options.

According to an embodiment, the second and third lenses 233 and 234 may have specified movement distances. For example, the second lens 233 may move a first distance from the first position to the second position (or vice versa). As another example, the third lens 234 may move a second distance from the third position to the fourth position (or vice versa). In an embodiment, the first and second distances may be different from each other.

According to an embodiment, the shaft 235 may couple the lens holder 231, and the first to third lenses 232 to 234. For example, the lens holder 231, and the first to third lenses 232 to 234 may each include a hole through which the shaft 235 passes. The lens holder 231, and the first to third lenses 232 to 234 may be coupled to each other by allowing the shaft 235 to pass through the holes.

According to an embodiment, the shaft 235 may determine the movement paths of the first to third lenses 232 to 234. The first to third lenses 232 to 234 may be moved forward or backward by each of the driving units 240 to 260 and the movement paths may be guided by the shaft 235.

The first to fifth driving units 240, 250, 260, 270 and 280 may move the first to third lenses 232 to 234, the lens holder 231, the reflection member 220 in a specified direction, respectively. According to various embodiments, some of the driving units 240, 250, 260, 270 and 280 may be omitted, and/or other driving units may be added. According to an embodiment, two of the driving units 240, 250, 260, 270 and 280 may be arranged adjacent to a same surface of the housing 210. For example, as shown in FIG. 2A the first and third driving units 240 and 260 may be arranged in the housing 210 while being adjacent to the same surface. As another example, the second and fourth driving units 250 and 270 may be arranged in the housing 210 while being adjacent to the same surface, as seen in FIG. 2B.

According to an embodiment, the driving units 240, 250, 260, 270, and 280 may move the reflection member 220, the lens holder 231, and the first to third lenses 232 to 234 by using a current flowing through a coil and a magnetic field formed by the current. According to an embodiment, the driving units 240, 250, 260, 270 and 280 may correspond to voice coil motors. The voice coil motor, which is an actuator that operates using the Lorentz force, may include a polarized voice coil motor and a solenoid type voice coil motor.

According to an embodiment, the first to third driving units 240, 250 and 260 may move the first to third lenses 232 to 234 in the optical axis direction, respectively. The fourth driving unit 270 may move the lens holder 231 in a direction perpendicular to the optical axis direction and the fifth driving unit 280 may rotate the reflection member 220.

The image sensor 290 may generate image data corresponding to the subject by converting the light reflected from the subject or generated from the subject and passing through the lens unit 230 into an electrical signal. The image sensor 290 may include a pixel array in which a plurality of unit pixels (which may be referred to as sensor pixels) are arranged two-dimensionally. The pixel array may include hundreds to tens of millions of individual unit pixels. The image sensor 290 may be implemented by using, for example, a charge-coupled device (CCD) or a complementary metal-oxide-semiconductor (CMOS).

The connector 291 may be a connecting terminal for connecting the camera module 200 to the electronic device 100. According to an embodiment, the camera module 200 may transmit the image data generated by the image sensor 290 to the electronic device 100 through an interface (e.g., MIPI).

Figure 3A:
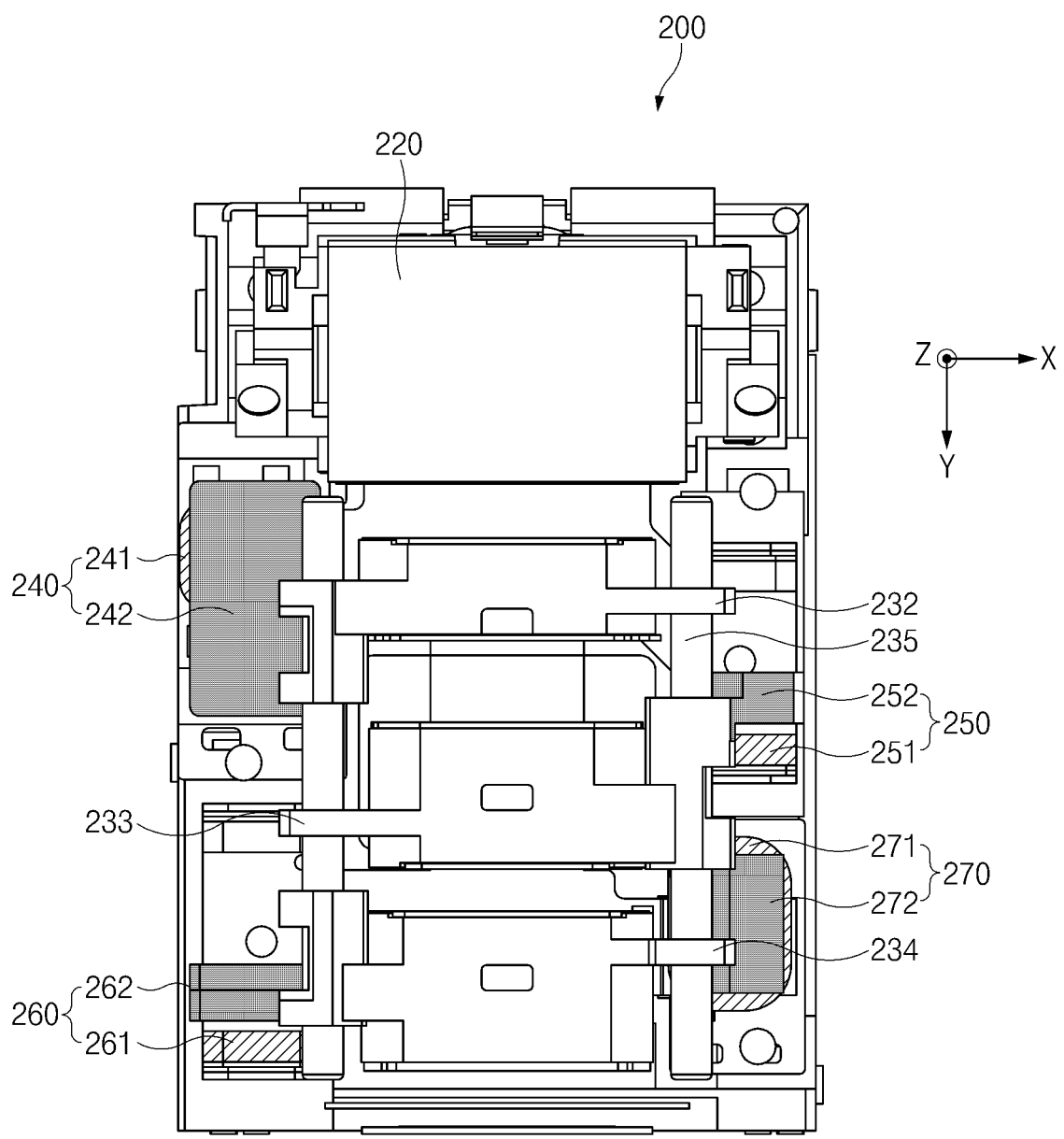
FIG. 3A is a plane view of a camera module according to an embodiment.
Figure 3B:
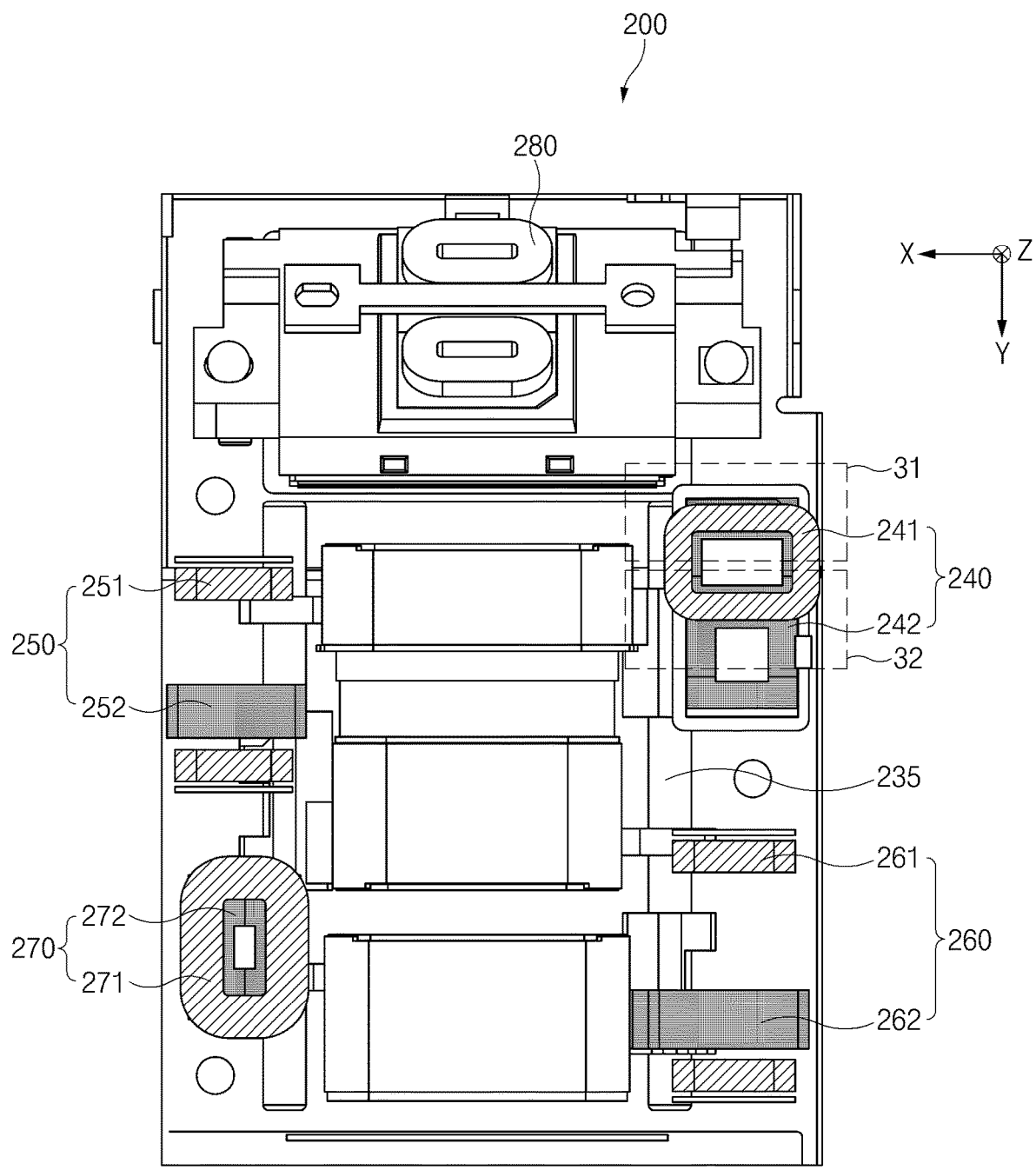
FIG. 3B is a rear view of a camera module according to an embodiment.

In the present disclosure, the components having the same reference numerals as those of the camera module 200 shown in FIGS. 2A to 2C may be equally applied to those described in FIGS. 3A and 3B.

FIG. 3A is a plain view of a camera module according to an embodiment.

FIG. 3B is a rear view of a camera module according to an embodiment.

FIGS. 3A and 3B illustrate arranged locations of the reflection member 220, at least one lens 232 to 234, and at least one driving unit 240, 250, 260, 270 and 280 included in the camera module 200. The housing 210 and the lens holder 231 are omitted from depiction in FIGS. 3A and 3B.

According to an embodiment, the driving unit (e.g., the first driving unit 240) may include at least one coil (e.g., a first coil 241) and a magnet (e.g., a first magnet 242). According to an embodiment, the magnets 242, 252, 262, 272 and 282 forming the driving units 240, 250, 260, 270 and 280 may be attached to the lenses 232 to 234 or the lens holder 231.

According to an embodiment, the driving units 240, 250, 260, 270 and 280 may move the reflection member 220, the lenses 232 to 234, or the lens holder 231 through the interaction of the coils 241, 251, 261, 271 and 281 and the magnets 242, 252, 262, 272 and 282. For example, when a current flows through the coil, an electromagnetic force may be generated in a direction perpendicular to the direction of the current and the direction of the magnetic field by the magnet. The electromagnetic force may move the reflection member 220, the lenses 232 to 234, or the lens holder 231 by moving the magnet. As another example, when a current flows through the coil, the direction of the magnetic field is determined by Ampere's right-handed "screw" rule (e.g., right-hand "grip", "screw," or "corkscrew" rule), and the magnetic field may generate a magnetic force in the magnet. The magnet is moved by the magnetic force so that the reflection member 220, the lenses 232 to 234, or the lens holder 231 may be moved.

According to an embodiment, the first driving unit 240 may include the first coil 241 and the first magnet 242. According to an embodiment, the first driving unit 240 may be a polarized voice coil motor. In an embodiment, the first magnet 242 is magnetized in the +Z-axis direction in a first region 31 and magnetized in the −Z-axis direction in a second region 32. The direction of the magnetic field formed by the first magnet 242 may be the +Z-axis direction or the −Z-axis direction depending on the magnetized direction.

In an embodiment, when a current flows through the first coil 241, because the directions of currents in the first and second regions 31 and 32 are opposite to each other, the directions of the electromagnetic forces in the first and second regions 31 and 32 may be the same. For example, when viewed from the back of the camera module 200, the current flowing through the first coil 241 may flow in a counterclockwise direction. In this case, since the direction of the magnetic field in the first region 31 is the +Z-axis direction and the direction of the current is the +X-axis direction, the direction of the electromagnetic force acting on the first coil 241 in the first region 31 is +Y-axis direction.

Since the direction of the electromagnetic force in the second region 32 is −Z-axis direction and the direction of the current is the −X-axis direction, the direction of the electromagnetic force acting on the first coil 241 in the second region 32 may also be the +Y-axis direction. Since the first coil 241 is attached to the housing 210 and does not move, the first magnet 242 and the first lens 232 may be moved in the −Y-axis direction.

According to an embodiment, the second driving unit 250 may include the second coil 251 and the second magnet 252. According to an embodiment, the second driving unit 250 may be a solenoid type voice coil motor. In an embodiment, the second coil 251 may include a plurality of coils. In an embodiment, when a current flows through the coils in the same direction, a magnetic field may be generated in the second coil 251 in the direction determined by Ampere's right-handed screw rule. For example, when a current flows through the second coil 251 in the counterclockwise direction when viewed in the direction in which the reflection member is located, a magnetic field may be generated in the −Y-axis direction by Ampere's right-handed screw rule. In this case, the second magnet 252 may move in the +Y or −Y-axis direction depending on the polarity direction. The second lens 233 may move together with the second magnet 252.

According to an embodiment, the operation of the third driving unit 260 may be the same as or similar to that of the second driving unit 250. The operation of the fourth driving unit 270 may be the same as or similar to that of the first driving unit 240.

According to an embodiment, the fifth driving unit 280 may include a plurality of coils and a magnet. In an embodiment, at least a part of the magnet may be magnetized in a first direction (e.g., the direction of vector R in FIG. 4) and the remaining part may be magnetized in the direction opposite to the first direction. In an embodiment, at least one of the coils may apply a force to at least a part of the magnet in the first direction. The at least one coil and at least one other coil may apply a force against a remaining part of the magnet in a direction opposite to the first direction. The magnet may be rotated in a specified direction by applying forces to mutually different points of the magnet in directions opposite to each other.

According to an embodiment, the driving unit for performing the zoom function may have a longer driving distance than the driving unit for performing the AF or OIS function. According to an embodiment, the first driving unit 240 may perform the AF function by moving the first lens 232. The second and third driving units 250 and 260 may perform the zoom function by moving the second and third lenses 233 and 234, respectively. The fourth driving unit 270 may move the lens holder 231 to perform the OIS function. In an embodiment, the driving distances of the second and third driving units 250 and 260 may be longer than those of the first and fourth driving units 240 and 270.

According to an embodiment, since the size of the camera module 200 is limited, the planes on which the driving units 240, 250, 260, 270 and 280 are arranged may be determined based on the driving distances. For example, the second and third driving units 250 and 260, which have relatively long driving distances, may be arranged on mutually different inner surfaces of the housing 210.

Figure 4:
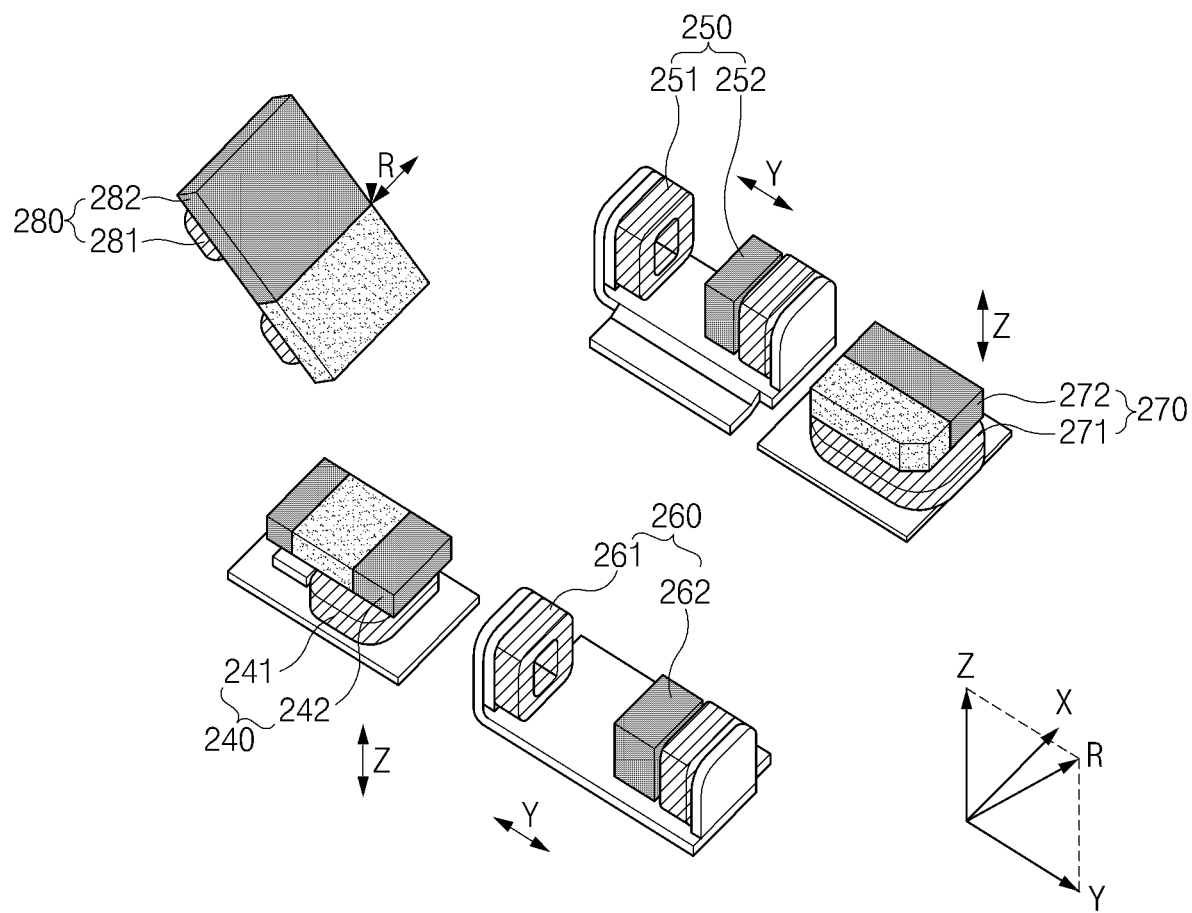
FIG. 4 is a view illustrating an arrangement of a driving unit of a camera module according to an embodiment.

In the present disclosure, the components having the same reference numerals as those of the camera module 200 shown in FIGS. 3A and 3B may be equally applied to those described in FIG. 4.

FIG. 4 is a view illustrating an arrangement of a driving unit of a camera module according to an embodiment.

Referring to FIG. 4, the arrangement positions of the driving units 240, 250, 260, 270 and 280 included in the camera module 200 and the directions of the magnetic fields formed by each of the driving units 240, 250, 260, 270 and 280 are illustrated.

According to an embodiment, when a current flows through the coil, a magnetic field may be formed in a direction determined by the right hand screw rule. That is, a magnetic field may be formed in the camera module 200 in a direction in which the coil (e.g., the first coil 241) faces the magnet (e.g., the first magnet 242).

According to an embodiment, the first driving unit 240 may form a magnetic field in the Z-axis direction, and the second driving unit 250 may form a magnetic field in the Y-axis direction. The third driving unit 260 may form a magnetic field in the Y-axis direction, and the fourth driving unit 270 may form a magnetic field in the Z-axis direction. The fifth driver 280 may form a magnetic field in the direction of an arbitrary vector R on the y-z plane.

According to an embodiment, the magnetic field formed by each of the driving units (e.g., the first driving unit 240) may exert an influence on the magnet (e.g., the second magnet 252) included in another driving unit (e.g., the second driving unit 250). For example, the magnetic field formed by the first driving unit 240 may exert an influence on the third magnet 262 included in the third driving unit 260 adjacent to the first driving unit 240. As described above, it may be understood, for example, that magnetic interference is generated by the magnetic field formed by each of the driving units insofar as each exerts an influence on the magnet included in another driving unit.

According to an embodiment, the magnetic interference between driving units that are spaced apart from each other by a sufficient distance may be equal to or less than a specified degree. For example, the magnetic interference between the first and second driving units 240 and 250 may be equal to or less than a specified degree. When the magnetic interferences between the driving units 240, 250, 260, 270 and 280 are equal to or less than a specified degree, each of the driving units 240, 250, 260, 270 and 280 may sufficiently move the magnets and lenses, and the camera module 200 may perform various functions normally.

According to an embodiment, even if the driving units are adjacent to each other, when the directions of the magnetic fields formed by the driving units make a specified angle while crossing each other, the magnetic interferences between the driving units may be equal to or less than a specified degree. The specified angle may be, for example, in the range of about 90°±45°. Since the at least one lens 232 to 234 included in the lens unit 230 moves by the guiding of the shaft 235, even though the directions of the magnetic fields formed by the driving units are not exactly orthogonal to each other, the camera module 200 may perform various functions normally.

For example, the first and third driving units 240 and 260 may be adjacent to each other and may not be separated by a sufficient distance. Since the magnetic field formed by the first driving unit 240 is formed in the Z-axis direction and the magnetic field formed by the third driving unit 260 is formed in the Y-axis direction, the two magnetic fields may be orthogonal to each other. In this case, the magnetic interference between the first and third driving units 240 and 260 may be equal to or less than the specified degree.

As still another example, the first and fifth driving units 240 and 280 may be adjacent to each other and may not be separated by the sufficient distance. Since the magnetic field formed by the first driving unit 240 is formed in the Z-axis direction and the magnetic field formed by the fifth driving unit 280 is formed in the direction of vector R, the magnetic interference between the first and fifth driving units 240 and 280 may be equal to or less than the specified degree.

Referring to Table 1 below, it may be confirmed that the magnetic interference between the second and fourth driving units 250 and 270 is equal to or less than the specified degree. Table 1 shows the experimental values of the magnetic forces applied to the second and fourth magnets 252 and 272 when the second magnet 252 is closest to the fourth driving unit 270 and the fourth magnet 272 is closest to the second driving unit 250 in the camera module according to an embodiment. The experimental values may be measured as different values depending on the design of the camera module. The unit of magnetic force may be expressed as gf (gram force). The second magnet 252 may receive a magnetic force of about −0.0463 gf in the Y-axis direction in which the fourth driver 270 is positioned, and the fourth magnet 272 may receive a magnetic force of −0.0107 gf in the Y-axis direction in which the second driving unit 250 is positioned. Since the magnitude of the magnetic force is less than the thrust (a value, such as about 0.5 gf, within about 10% of about 5 gf) of the second or fourth driving unit 250 or 270, the magnetic interference may be equal to or less than a specified degree.

TABLE 1

| | Magnet | | | | | |
|---|---|---|---|---|---|---|
| | Second magnet (252) | | | Fourth magnet (272) | | |
| | X | Y | Z | X | Y | Z |
| Magnetic force (gf) | −0.0169 | −0.0463 | −0.1435 | −0.0674 | −0.0107 | 0.2757 |

Figure 5:
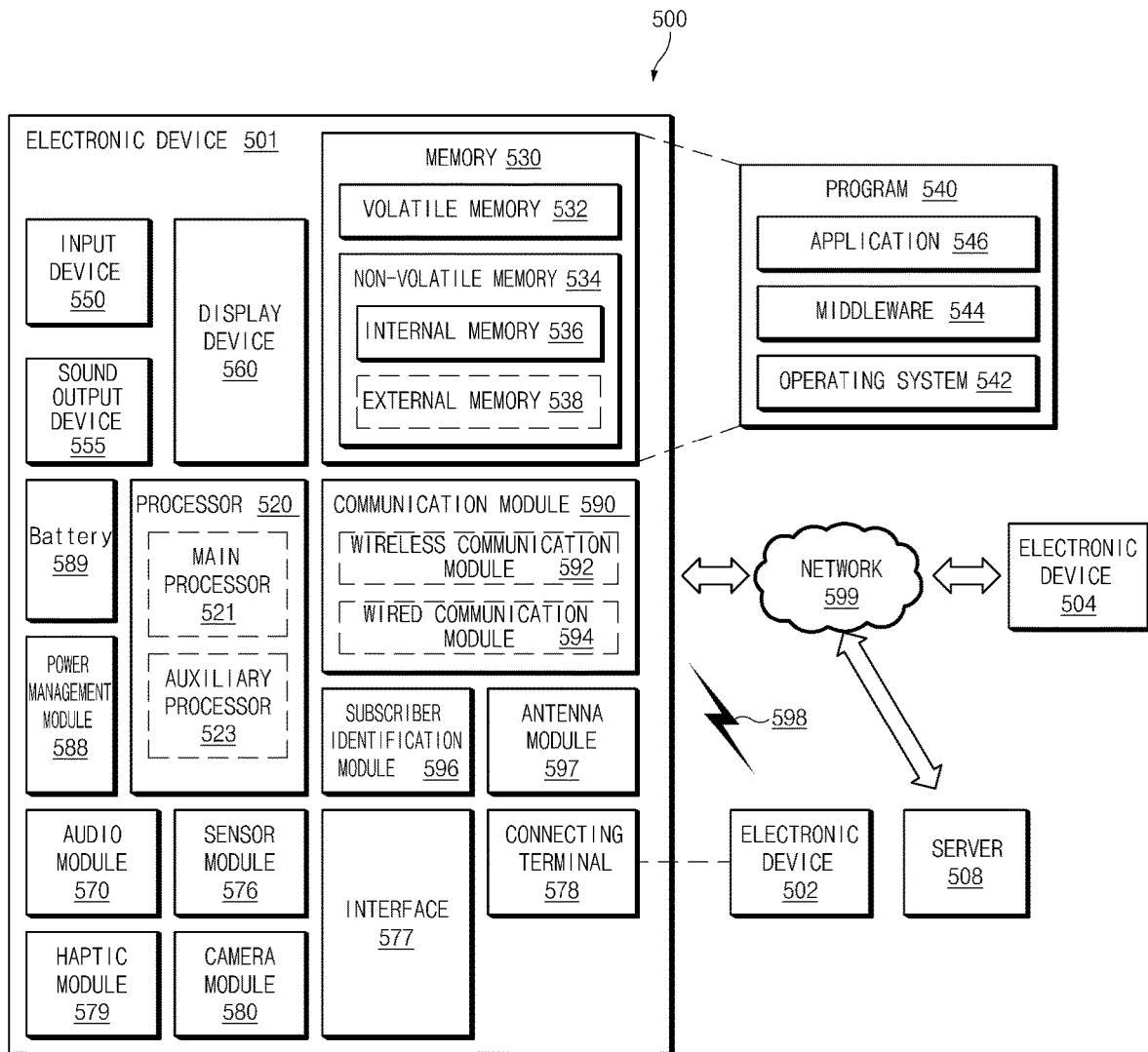
FIG. 5 is a block diagram of an electronic device in a network environment according to various embodiments.

FIG. 5 is a block diagram of an electronic device in a network environment according to various embodiments.

Referring to FIG. 5, an electronic device 501 (e.g., the electronic device 100) may communicate with an electronic device 502 through a first network 598 (e.g., a short-range wireless communication) or may communicate with an electronic device 504 or a server 508 through a second network 599 (e.g., a long-distance wireless communication) in a network environment 500. According to an embodiment, the electronic device 501 may communicate with the electronic device 504 through the server 508. According to an embodiment, the electronic device 501 may include a processor 520, a memory 530, an input device 550, a sound output device 555, a display device 560, an audio module 570, a sensor module 576, an interface 577, a haptic module 579, a camera module 580 (e.g., the camera module 200), a power management module 588, a battery 589, a communication module 590, a subscriber identification module 596, and an antenna module 597. According to some embodiments, at least one (e.g., the display device 560 or the camera module 580) among components of the electronic device 501 may be omitted or other components may be added to the electronic device 501. According to some embodiments, some components may be integrated and implemented as in the case of the sensor module 576 (e.g., a fingerprint sensor, an iris sensor, or an illuminance sensor) embedded in the display device 560 (e.g., a display).

The processor 520 may operate, for example, software (e.g., a program 540) to control at least one of other components (e.g., a hardware or software component) of the electronic device 501 connected to the processor 520 and may process and compute a variety of data. The processor 520 may load a command set or data, which is received from other components (e.g., the sensor module 576 or the communication module 590), into a volatile memory 532, may process the loaded command or data, and may store result data into a nonvolatile memory 534. According to an embodiment, the processor 520 may include a main processor 521 (e.g., a central processing unit or an application processor) and an auxiliary processor 523 (e.g., a graphic processing device, an image signal processor, a sensor hub processor, or a communication processor), which operates independently from the main processor 521, additionally or alternatively uses less power than the main processor 521, or is specified to a designated function. In this case, the auxiliary processor 523 may operate separately from the main processor 521 or embedded.

In this case, the auxiliary processor 523 may control, for example, at least some of functions or states associated with at least one component (e.g., the display device 560, the sensor module 576, or the communication module 590) among the components of the electronic device 501 instead of the main processor 521 while the main processor 521 is in an inactive (e.g., sleep) state or together with the main processor 521 while the main processor 521 is in an active (e.g., an application execution) state. According to an embodiment, the auxiliary processor 523 (e.g., the image signal processor or the communication processor) may be implemented as a part of another component (e.g., the camera module 580 or the communication module 590) that is functionally related to the auxiliary processor 523. The memory 530 may store a variety of data used by at least one component (e.g., the processor 520 or the sensor module 576) of the electronic device 501, for example, software (e.g., the program 540) and input data or output data with respect to one or more instructions associated with the software. The memory 530 may include the volatile memory 532 or the nonvolatile memory 534.

The program 540 may be stored in the memory 530 as software and may include, for example, an operating system 542, a middleware 544, or an application 546.

The input device 550 may be a device for receiving a command or data, which is used for a component (e.g., the processor 520) of the electronic device 501, from an outside (e.g., a user) of the electronic device 501 and may include, for example, a microphone, a mouse, or a keyboard.

The sound output device 555 may be a device for outputting a sound signal to the outside of the electronic device 501 and may include, for example, a speaker used for general purposes, such as multimedia play or recordings play, and a receiver used for receiving calls. According to an embodiment, the receiver and the speaker may be either integrally or separately implemented.

The display device 560 may be a device for visually presenting information to the user and may include, for example, a display, a hologram device, or a projector and a control circuit for controlling a corresponding device. According to an embodiment, the display device 560 may include a touch circuitry or a pressure sensor for measuring an intensity of pressure on the touch.

The audio module 570 may convert a sound and an electrical signal in dual directions. According to an embodiment, the audio module 570 may obtain the sound through the input device 550 or may output the sound through an external electronic device (e.g., the electronic device 502 (e.g., a speaker or a headphone)) wired or wirelessly connected to the sound output device 555 or the electronic device 501.

The sensor module 576 may generate an electrical signal or a data value corresponding to an operating state (e.g., power or temperature) inside or an environmental state outside the electronic device 501. The sensor module 576 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 577 may support a designated protocol wired or wirelessly connected to the external electronic device (e.g., the electronic device 502). According to an embodiment, the interface 577 may include, for example, an HDMI (high-definition multimedia interface), a USB (universal serial bus) interface, an SD card interface, or an audio interface.

A connecting terminal 578 may include a connector that physically connects the electronic device 501 to the external electronic device (e.g., the electronic device 502), for example, an HDMI connector, a USB connector, an SD card connector, or an audio connector (e.g., a headphone connector).

The haptic module 579 may convert an electrical signal to a mechanical stimulation (e.g., vibration or movement) or an electrical stimulation perceived by the user through tactile or kinesthetic sensations. The haptic module 579 may include, for example, a motor, a piezoelectric element, or an electric stimulator.

The camera module 580 may shoot a still image or a video image. According to an embodiment, the camera module 580 may include, for example, at least one lens, an image sensor, an image signal processor, or a flash.

The power management module 588 may be a module for managing power supplied to the electronic device 501 and may serve as at least a part of a power management integrated circuit (PMIC).

The battery 589 may be a device for supplying power to at least one component of the electronic device 501 and may include, for example, a non-rechargeable (primary) battery, a rechargeable (secondary) battery, or a fuel cell.

The communication module 590 may establish a wired or wireless communication channel between the electronic device 501 and the external electronic device (e.g., the electronic device 502, the electronic device 504, or the server 508) and support communication execution through the established communication channel. The communication module 590 may include at least one communication processor operating independently from the processor 520 (e.g., the application processor) and supporting the wired communication or the wireless communication. According to an embodiment, the communication module 590 may include a wireless communication module 592 (e.g., a cellular communication module, a short-range wireless communication module, or a GNSS (global navigation satellite system) communication module) or a wired communication module 594 (e.g., an LAN (local area network) communication module or a power line communication module) and may communicate with the external electronic device using a corresponding communication module among them through the first network 598 (e.g., the short-range communication network such as a Bluetooth, a WiFi direct, or an IrDA (infrared data association)) or the second network 599 (e.g., the long-distance wireless communication network such as a cellular network, an internet, or a computer network (e.g., LAN or WAN)). The above-mentioned various communication modules 590 may be implemented into one chip or into separate chips, respectively.

According to an embodiment, the wireless communication module 592 may identify and authenticate the electronic device 501 using user information stored in the subscriber identification module 596 in the communication network.

The antenna module 597 may include one or more antennas to transmit or receive the signal or power to or from an external source. According to an embodiment, the communication module 590 (e.g., the wireless communication module 592) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 501 and the external electronic device 504 through the server 508 connected to the second network 599. Each of the electronic devices 502 and 504 may be the same or different types as or from the electronic device 501. According to an embodiment, all or some of the operations performed by the electronic device 501 may be performed by another electronic device or a plurality of external electronic devices. When the electronic device 501 performs some functions or services automatically or by request, the electronic device 501 may request the external electronic device to perform at least some of the functions related to the functions or services, in addition to or instead of performing the functions or services by itself. The external electronic device receiving the request may carry out the requested function or the additional function and transmit the result to the electronic device 501. The electronic device 501 may provide the requested functions or services based on the received result as is or after additionally processing the received result. To this end, for example, a cloud computing, distributed computing, or client-server computing technology may be used.

Figure 6:
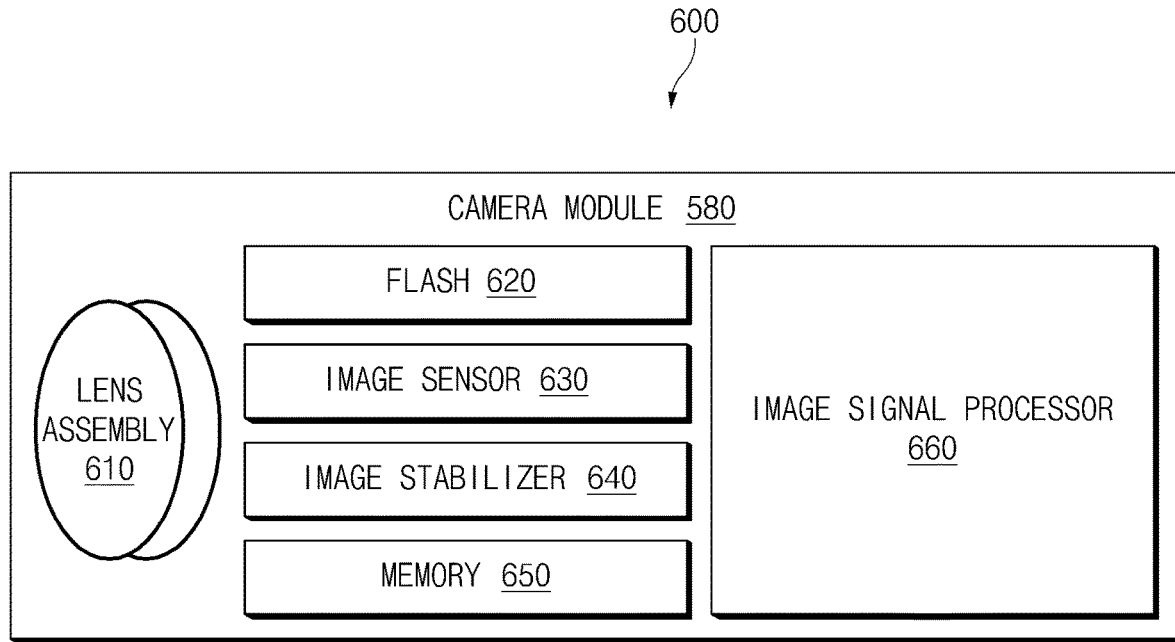
FIG. 6 is a block diagram of a camera module according to various embodiments.

FIG. 6 is a block diagram of a camera module according to various embodiments.

Referring to FIG. 6, the camera module 580 (e.g., the camera module 200) may include a lens assembly 610 (e.g., the lens unit 230), a flash 620 (e.g., the flash 120), an image sensor 630 (e.g., the image sensor 290), an image stabilizer 640, a memory (e.g., a buffer memory) 650, or an image signal processor 660. The lens assembly 610 may collect light emitted from a subject to be captured. The lens assembly 610 may include one or more lenses. According to an embodiment, the camera module 580 may include a plurality of lens assemblies 610. In this case, the camera module 580 may be, for example, a dual camera, a 360-degree camera, or a spherical camera. The plurality of lens assemblies 610 may have the same lens properties (e.g., a field of view, a focal length, an autofocus, an f number, or an optical zoom), or at least one lens assembly may be different from another lens assembly in at least one lens attribute. For example, the lens assembly 610 may include a wide-angle lens or a telephoto lens. The flash 620 may emit light in order to strengthen light emitted from the subject. The flash 620 may include one or more light emitting diodes (e.g., a red-green-blue (RGB) LED, a white LED, an infrared LED, or an ultraviolet LED), or a xenon lamp.

The image sensor 630 may acquire an image corresponding to the subject by converting light, which is received from the subject through the lens assembly 610, to an electrical signal. According to an embodiment, the image sensor 630 may include, for example, one selected from image sensors having different properties, such as an RGB sensor, a black and white (BW) sensor, an IR sensor, or a UV sensor, a plurality of image sensors having the same property, or a plurality of image sensors having different properties. For example, each image sensor included in the image sensor 630 may be implemented with a charged coupled device (CCD) sensor or a complementary metal oxide semiconductor (CMOS) sensor.

The image stabilizer 640 may move or control (e.g., adjustment of read-out timing, and the like) at least one lens included in the lens assembly 610 or the image sensor 630 in a specific direction to at least partially compensate for a negative effect (e.g., image blurring) exerted on the captured image due to movement of the camera module 580 or the electronic device 501 including the camera module 580. According to an embodiment, the image stabilizer 640 may be implemented, for example, with an optical image stabilizer and may detect the movement by using a gyro sensor (not illustrated) or an acceleration sensor (not illustrated) located inside or outside the camera module 580.

The memory 650 may at least temporarily store at least a part of the image obtained through the image sensor 630 for a next image processing operation. For example, when image acquisition by the shutter is delayed or a plurality of images are acquired at a high speed, the acquired original image (e.g., a high-resolution image) is stored in the memory 650, and a copy image (e.g., a low-resolution image) corresponding to the original image may be previewed through the display device 560. Then, when a specified condition (e.g., a user input or system instruction) is satisfied, at least a part of the original image stored in the memory 650 may be obtained and processed, for example, by the image signal processor 660. According to an embodiment, the memory 650 may be implemented with at least a part of the memory 530 or a separate memory operated independent of the memory 530.

The image signal processor 660 may perform image processing (e.g., depth map generation, three-dimensional modeling, panorama generation, feature point extraction, image composition, or image compensation (e.g., noise reduction, resolution adjustment, brightness adjustment, blurring, sharpening, or softening)) with respect to an image acquired through the image sensor 630 or an image stored in the memory 650. Additionally or alternatively, the image signal processor 660 may perform control operation (e.g., exposure time control, lead-out timing control, or the like) of at least one of the components (e.g., the image sensor 630) included in the camera module 580. The image processed by the image signal processor 660 may be re-stored in the memory 650 for additional processing or may be transmitted to an external component (e.g., the memory 530, the display device 560, the electronic device 502, the electronic device 504, or the server 508) of the camera module 580. According to an embodiment, the image signal processor 660 may be configured as at least a part of the processor 520, or may be configured as a separate processor operating independently of the processor 520. When the image signal processor 660 is configured as a separate processor, the images processed by the image signal processor 660 may be displayed by the processor 520 through the display device 560 as they are or after being additionally image-processed.

According to an embodiment, the electronic device 501 may include two or more camera modules 580 having mutually different properties or functions. In this case, for example, the at least one camera module 580 may be a wide-angle camera or a front camera and at least one other camera module may be a telephoto camera or a rear camera.

According to the embodiments of the present disclosure, the location movement of the lens included in the camera module can be normally performed. Thus, the camera module may stably perform the zoom function, the AF function, and the OIS function.

In addition, according to the embodiments of the present disclosure, since the camera module may limit the magnetic interference between the driving units to a specified degree or less even though a separated shielding member is not used, the size of the camera module may be miniaturized. Thus, the electronic device including the camera module may efficiently utilize the limited mounting area.

According to an embodiment, there is provided a camera module that includes a housing, a lens unit arranged in the housing and including at least one lens, a first driving unit arranged adjacent to a first surface inside the housing to move the at least one lens in a direction of an optical axis, and a second driving unit arranged adjacent to the first surface inside the housing to move the lens unit in a direction perpendicular to the optical axis, where the first driving unit forms a first magnetic field in a first direction, and wherein the second driving unit forms a second magnetic field in a second direction intersecting the first direction at a specified angle.

The second driving unit may form the second magnetic field in the second direction perpendicular to a direction of the first magnetic field.

The magnetic interference between the first and second driving units may be measured at a specified degree or less.

A length of movement of the at least one lens may be longer than a length of movement of the lens unit.

The first driving unit may include a solenoid voice coil motor, and the second driving unit may include a polarized voice coil motor.

The first driving unit may perform a zoom function by moving the at least one lens in the direction of the optical axis.

The second driving unit may perform an optical image stabilization (OIS) function by moving the lens unit in the direction perpendicular to the optical axis.

The camera module may further include a third driving unit, wherein the lens unit includes a first lens and a second lens, the first driving unit moves the first lens in the direction of the optical axis, and the third driving unit is arranged adjacent to a second surface facing the first surface inside the housing to move the second lens in the direction of the optical axis.

The first driving unit may perform a zoom function by moving the first lens in the direction of the optical axis, and the third driving unit may perform an auto focus function by moving the second lens in the direction of the optical axis.

The camera module may further include a fourth driving unit arranged adjacent to the second surface inside the housing, wherein the lens unit further includes a third lens, the third driving unit forms a third magnetic field in a third direction, and the fourth driving unit moves the third lens in the direction of the optical axis and forms a fourth magnetic field in a fourth direction intersecting the third direction at a specified angle.

The fourth driving unit may form the fourth magnetic field in the fourth direction perpendicular to the third direction.

The magnetic interference between the third and fourth driving units may be measured at a specified degree or less.

The fourth driving unit may perform a zoom function by moving the third lens in the direction of the optical axis.

According to another embodiment, there is provided a camera module that includes a housing, a lens unit contained in the housing and including first and second lenses movable along a specified path, a first driving unit including a first coil arranged on a part of one surface of the housing, the first coil having a shape for outputting, in a first direction, a magnetic field for moving the first lens along the specified path, and a second driving unit including a second coil arranged on another part of the one surface, the second coil having a shape for outputting, in a second direction perpendicular to the first direction, another magnetic field for moving the second lens along the specified path.

The magnetic interference between the first and second driving units may be measured at a specified degree or less.

The first driving unit may move the first lens in a direction of an optical axis, and the second driving unit may move the second lens in the direction of the optical axis.

The first driving unit may perform an auto focus function, and the second driving unit may perform a zoom function.

The lens unit may further include a third lens movable in the specified path, where the camera module may further include a third driving unit including a third coil arranged on a part of another surface of the housing, and the third coil may have a shape for outputting, in the first direction, a magnetic field for moving the third lens along the specified path.

The camera module may further include a fourth driving unit including a fourth coil arranged on another part of the another surface, wherein the fourth coil has a shape for outputting, in the second direction, a magnetic field for moving the lens unit along another path perpendicular to the specified path.

The magnetic interference between the third and fourth driving units may be measured at a specified degree or less.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 540) including an instruction stored in a machine-readable storage media (e.g., the internal memory 536 or the external memory 538) readable by a machine (e.g., a computer). The machine may be a device that calls the instruction from the machine-readable storage media and operates depending on the called instruction and may include the electronic device (e.g., the electronic device 501). When the instruction is executed by the processor (e.g., the processor 520), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A camera module, comprising:
    a housing;
    a lens unit arranged in the housing and comprising a first lens and a second lens;
    a first driving unit arranged adjacent to a first surface inside the housing, and configured to move the first lens by a first distance in a direction of along an optical axis; and
    a second driving unit arranged adjacent to a second surface facing the first surface inside the housing, and configured to move the second lens by a second distance smaller than the first distance in a direction of along the optical axis,
    wherein the first driving unit forms a first magnetic field oriented in a first direction, and
    wherein the second driving unit forms a second magnetic field oriented in a second direction intersecting the first direction at a first prespecified angle.

2. The camera module of claim 1, wherein the second direction in which the second magnetic field is oriented is substantially perpendicular to the first direction in which an orientation of the first magnetic field.

3. The camera module of claim 1, wherein magnetic interference between the first and second driving units is a prespecified degree or less based on orientations of the first and second driving units in the first and second directions, respectively.

4. The camera module of claim 1, wherein the first driving unit is configured to execute a zoom function, and the second driving unit is configured to execute an auto focus function.

5. The camera module of claim 1, wherein the first driving unit includes a solenoid voice coil motor, and
    wherein the second driving unit includes a polarized voice coil motor.

6. The camera module of claim 1, further comprising a third driving unit arranged adjacent to the first surface inside the housing, and
    wherein the third driving unit forms a third magnetic field oriented in a third direction substantially parallel to the second direction.

7. The camera module of claim 6, wherein the third driving unit is configured to execute optical image stabilization (OIS) function by moving the lens unit in the direction perpendicular to the optical axis.

8. The camera module of claim 6, further comprising a fourth driving unit arranged adjacent to the first surface inside the housing,
    wherein the lens unit further comprises a third lens,
    wherein the fourth driving unit is configured to move the third lens by a third distance greater than the second distance in a direction along the optical axis,
    wherein fourth driving unit forms a third magnetic field oriented in a fourth direction intersecting the third direction at a second prespecified angle.

9. The camera module of claim 8, wherein each of the second driving unit and the third driving unit is configured to execute a zoom function, by adjusting the relative positions of the second and third lenses.

10. The camera module of claim 1, wherein the lens unit further comprises a lens holder configured to move in a direction perpendicular to the optical axis together with the first lens and the second lens,
therein the lens holder comprises a shaft extending in a direction parallel to the optical axis, and
wherein the first lens and the second lens are movably coupled to the shaft.

11. The camera module of claim 1, further comprising a fifth driving unit arranged on an axis disposed between the first and second driving units, and
wherein the fifth driving unit is disposed at an angle within the housing as to form a third magnetic field oriented in a third direction oblique to the first and second directions of the first and second magnetic fields.

12. A camera module, comprising:
a housing;
a lens unit arranged in the housing and comprising a plurality of lenses, the lens unit is disposed between a first surface of the housing and a second surface of the housing;
an image sensor arranged on an optical axis of the plurality of lenses;
a first coil arranged adjacent to the first surface inside housing;
a second coil arranged adjacent to the first surface inside the housing, the second coil is closer to the image sensor than the first coil;
a third coil arranged adjacent to the second surface inside housing; and
a fourth coil arranged adjacent to the second surface inside the housing, the fourth coil is closer to the image sensor than the third coil; and
wherein each of the first coil and the fourth coil forms a first magnetic field oriented in a first direction, and
wherein each of the second coil and the third coil forms a second magnetic field oriented in a second direction intersecting the first direction at a prespecified angle.

13. The camera module of claim 12,
wherein each of the first coil, the third coil, and the fourth coil is configured to move at least one lens of the plurality of lenses in a direction of along the optical axis, and
wherein the second coil is configured to move the lens unit in a direction substantially perpendicular to the optical axis of the plurality of lenses.

14. A camera module, comprising:
a housing;
a lens unit disposed within the housing and including first and second lenses movable along a specified path;
a first driving unit configured to execute an auto focus function, the first driving unit including a first coil arranged on a part of one surface of the housing, the first coil formed in a shape to output, in a first orientation, a first magnetic field for moving the first lens along the specified path; and
a second driving unit configured to execute a zoom function, the second driving unit including a second coil arranged on another part of the one surface, the second coil formed in a shape to output, in a second orientation perpendicular to the first orientation, a second magnetic field for moving the second lens along the specified path.

15. The camera module of claim 14, wherein magnetic interference between the first and second driving units is a prespecified degree or less based on the first and second orientations of the first and second coils, respectively.

16. The camera module of claim 14, wherein the first driving unit is configured to move the first lens in a direction along an optical axis, and
wherein the second driving unit is configured to move the second lens in the direction of the optical axis.

17. The camera module of claim 14, wherein the lens unit further includes a third lens movable in the specified path,
wherein the camera module further includes a third driving unit including a third coil arranged on a part of another surface of the housing, and
wherein the third coil is formed in a shape to output, in the first orientation, a magnetic field for moving the third lens along the specified path.

18. The camera module of claim 17, further comprising:
a fourth driving unit including a fourth coil arranged on a part of another surface of the housing,
wherein the fourth coil is formed in a shape to output, in the second orientation, a magnetic field for moving the lens unit along another path perpendicular to the specified path.

19. The camera module of claim 18, wherein magnetic interference between the third and fourth driving units is a prespecified degree or less based on the first and second orientations of the third and fourth coils, respectively.

* * * * *